M. C. SCHWEINERT.
PNEUMATIC VALVE.
APPLICATION FILED SEPT. 11, 1915.

1,382,389.

Patented June 21, 1921.

WITNESSES:
René Pruine
Fred White

INVENTOR
Maximilian Charles Schweinert,
By Attorneys,
Fraser, Junk & Myers

UNITED STATES PATENT OFFICE.

MAXIMILIAN CHARLES SCHWEINERT, OF WEST HOBOKEN, NEW JERSEY.

PNEUMATIC VALVE.

1,382,389. Specification of Letters Patent. Patented June 21, 1921.

Application filed September 11, 1915. Serial No. 50,120.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Pneumatic Valves, of which the following is a specification.

This invention relates to air valves such as are used for pneumatic tires.

Such valves comprise a tubular shell or casing having at its inner end any suitable means for attachment to the tire or inner tube, and having within it a check valve. In standard valves the casing is internally screw-threaded to receive a screw plug or seat member, against which the check or valve proper seats; and the casing is externally screw-threaded to receive a valve cap or a pump connection. The seat member is commonly made in two parts, namely, an inner plug carrying a seat and an outer screw plug which screws into the internal threads in the casing to press the seat plug into place. One or more packings are required in order to prevent leakage of air between the seat member and casing both during pumping up and subsequently during the normal use of the tire.

The present invention provides certain improvements in the construction of the seat member and its coaction with the outer or upper portion of the casing, the object of the invention being principally to avoid leakage during pumping up and subsequently when the valve cap is in place.

A feature of the invention consists in the formation of the upper end of both the seat member and casing so that when normally united they shall present flush or continuous outer packing faces to be simultaneously packed by the application of a gasket on a pump connection or on a valve cap.

The invention is shown embodied in the accompanying drawings, wherein,—

Figure 1:
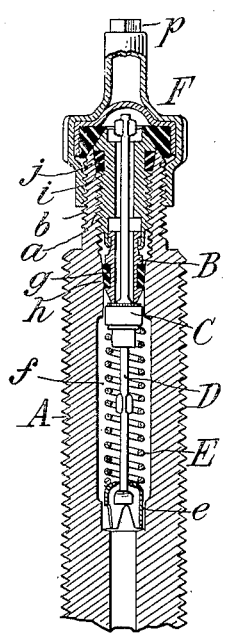
Figure 1 is a longitudinal mid-section through the outer portion of the valve, showing its preferred construction, with the valve cap in place.
Figure 2:
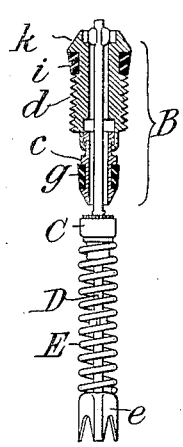
Fig. 2 is a similar section of the valve insides (so-called) removed from the casing.

In the drawings, A is the valve shell or casing, B the seat member, C the valve proper or check, D the valve pin or deflating stem, E the spring which seats the check, F the valve cap, and G a pump connection.

The casing A is made in the usual manner with its neck-portion suitably bored out and threaded to receive the valve member, and externally threaded to receive the valve cap or pump connection. Its internal threads are lettered $a$ and its external threads $b$. The seat member B is preferably made in two parts or sections, namely, the seat plug $c$ and a screw plug $d$, the latter having threads engaging the threads $a$ and the two plugs being preferably swiveled together in the usual manner.

The check C, pin D, spring E and keeper or abutment piece $e$ are all shown as of the usual construction, and entering an enlarged chamber $f$ in the casing, in the usual manner.

For making a tight joint between the seat member and casing the seat plug $c$ has an external groove in which is seated a gasket or packing ring $g$, as usual, which seats in the usual manner against a coned seat $h$ formed within the casing. The screw plug $d$ has a similar groove in which is held a gasket or packing ring $i$ having a suitably tapered outer face which seats tightly against a correspondingly tapered seating face $j$ in the upper part of the neck-portion of the casing close beneath the rim thereof.

Figure 7:
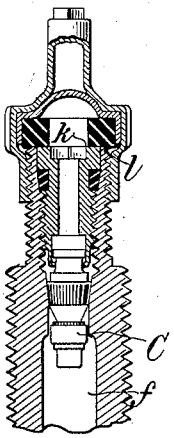
Fig. 7 is a section similar to Fig. 1, but showing a modified construction of the top or outer end of the valve casing and seat member.
Figure 8:
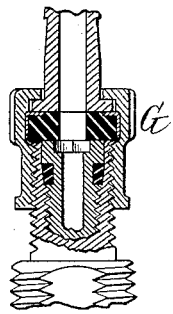
Fig. 8 is a similar view showing the pump connection in place.

When the screw plug $d$ is screwed fully home its top or upper face $k$ and the top or upper face $l$ of the rim of the casing stand flush or substantially so, so as to form a practically continuous surface to be engaged and packed by a gasket or packing ring within the cap or pump connection. Preferably, these faces $k$ $l$ are conical, as shown in Figs. 1 to 5, although they may be flat, as shown in Figs. 7 and 8.

The valve cap F has a gasket or packing ring $m$, the seating face of which has the same shape as the faces $k$ $l$, so that when the cap is screwed firmly home its gasket makes a tight joint with the faces $k$ $l$ and prevents leakage through the joint between them.

Figure 3:
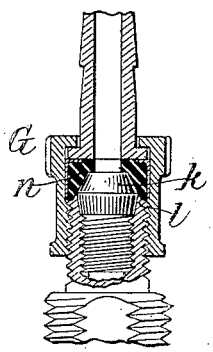
Fig. 3 shows a portion of Fig. 1 with a suitable pump connection applied.

The pump connection G likewise has a similar internal gasket or packing ring $n$ which, as shown in Fig. 3, engages in like manner with the faces $k$ $l$ and makes a tight joint therewith so as to prevent leakage while pumping up.

The coned faces $k$ $l$, in connection with the coned gaskets $m$ $n$, as shown in Figs. 1 to 6 inclusive, afford the most perfect security against leakage. Nevertheless, the flat seating faces shown in Figs. 7 and 8 are suitable and nearly as efficacious.

Figure 4:
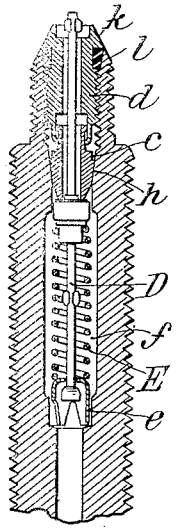
Fig. 4 is a section similar to Fig. 1, but showing a modified construction.
Figure 6:
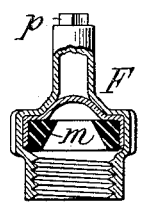
Fig. 6 is a section of the valve cap removed.

If the seat member B is made in two plugs, as shown, it is possible to omit either of the packings $g$ and $i$. In Fig. 4 the packing $g$ is omitted, the seat plug $c$ forming a metallic fit with the internal seat $h$, which fit, if not absolutely air-tight is sufficiently so to prevent any objectionable leakage while disconnecting the pump connection and applying the cap. The cap, when applied, should make an absolutely tight joint, which eliminates all risk of leakage.

Figure 9:
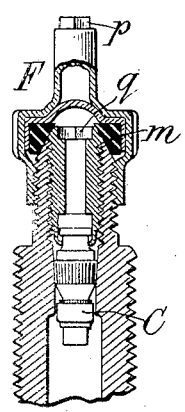
Fig. 9 is a view similar to Fig. 1 and illustrating a slight modification.

The packing ring $i$ may be omitted, as shown in Fig. 9. This is rendered possible by the tight packing made against the faces $k$ $l$ by the gaskets $m$ $n$.

Figure 5:
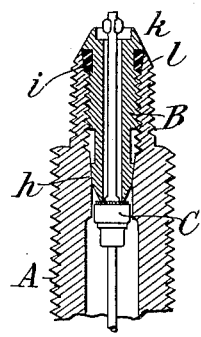
Fig. 5 is a similar section showing another modification.

Instead of making the seat member B in two plugs it may be made in one, as shown in Fig. 5. In this case the single plug, shown as screwing down against a metallic seat, as in Fig. 4, has a packing $i$ above, serving to make the seat member tight if leakage occurs past these metal faces.

For screwing in the screw plug $d$ (or the integral seat member B of Fig. 5) any suitable construction may be provided whereby the screw plug may be engaged by any sort of key. The drawings show the valve cap F with an upward extension $p$, the end of which forms a key, the screw plug having such provision as will enable it to be engaged by this key. For this purpose in Fig. 9 the screw plug is shown as formed in its top with a socket $q$ to conform to the key end of the cap. The key is shown as square, and the socket $q$ is also square, but any other suitable shape may be provided.

The features of construction of the valve other than those referred to in the present invention may be modified or varied in any of the well-known ways or by any substitution of equivalents, such as are well understood.

In the claims I use the general expression "screw top" to cover either a valve cap or a pump connection which interchangeably screw upon the upper end or neck of the valve member.

I do not herein claim broadly the construction of a valve which comprises a swiveled seat member and a screw plug having a manipulating flange above the top of the valve casing and of smaller diameter than said casing, since this is the invention of another.

I claim as my invention:—

1. A valve comprising a tubular valve casing, a screw member with a coöperating check adapted to be screwed into and out of the valve casing, said screw member having a manipulating portion extending beyond the end of the casing when in place, said projecting portion lying close to the end of the casing, whereby either a cap or a pump coupling may engage the end of the casing, combined with a screw part having a thread adapted to engage the end of the casing, and having secured therein an internal packing gasket adapted to engage both the end of the casing and said manipulating portion.

2. A valve comprising a tubular valve casing, a screw member with a coöperating check adapted to be screwed into and out of the valve casing, said screw member having a manipulating portion extending beyond the end of the casing when in place, said projecting portion lying close to the end of the casing, whereby either a cap or a pump coupling may engage the end of the casing, combined with a screw top having a thread adapted to engage the end of the casing, and having secured therein an internal packing gasket adapted to engage both the end of the casing and said manipulating portion, and said end and manipulating portion having a continuous cone surface, and said gasket having an internal cone surface contacting therewith.

3. A valve comprising a tubular valve casing, a screw member with a coöperating check adapted to be screwed into and out of the valve casing, said screw member having a manipulating portion extending beyond the end of the casing when in place, said projecting portion lying close to the end of the casing, whereby either a cap or a pump coupling may engage the end of the casing, combined with a screw top having a thread adapted to engage the end of the casing, and having secured therein an internal packing gasket adapted to engage both the end of the casing and said manipulating portion, and said top having a recess of greater diameter than its screw-threaded portion, receiving said gasket and holding the latter in place therein.

4. The combination with a valve comprising a shell and inside or working parts having a portion projecting beyond the shell, the end of said shell and said portion being provided with coned surfaces extending in substantially the same direction, of a cap having an internal gasket formed with an internally tapered seating face adapted to make a leak-tight contact with both of said coned faces.

5. The combination with a valve comprising a shell and inside or working parts having a portion projecting beyond the shell, the end of said shell and said portion being provided with similarly coned surfaces meeting substantially flush with one another, of a cap screwing over said shell having an internal gasket formed with an internally coned seating face conforming to said coned surfaces and adapted to make a leak-tight contact therewith to seal the joint between them, and said gasket adapted also to make a leak-tight joint sealing the interior of the valve.

In witness whereof, I have hereunto signed my name in the presence of two subscribing witnesses.

MAXIMILIAN CHARLES SCHWEINERT.

Witnesses:
THOMAS F. WALLACE,
FRED WHITE.